US006237074B1

United States Patent
Phillips et al.

(10) Patent No.: US 6,237,074 B1
(45) Date of Patent: *May 22, 2001

(54) TAGGED PREFETCH AND INSTRUCTION DECODER FOR VARIABLE LENGTH INSTRUCTION SET AND METHOD OF OPERATION

(75) Inventors: Christopher E. Phillips; Robert J. Divivier; Mario Nemirovsky, all of San Jose, CA (US)

(73) Assignee: National Semiconductor Corp., Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/445,563

(22) Filed: May 26, 1995

(51) Int. Cl.[7] .................................................. G06F 12/00
(52) U.S. Cl. .......................... 711/213; 711/217; 712/200; 712/210
(58) Field of Search .................................. 711/213, 217, 711/137, 212, 167, 169, 157, 214; 712/200, 205–208, 237–239, 210

(56) References Cited

U.S. PATENT DOCUMENTS

| 4,223,381 | * | 9/1980 | Rozel et al. | 711/213 |
|---|---|---|---|---|
| 4,620,274 | * | 10/1986 | Boothroyd et al. | 711/220 |
| 5,142,634 | * | 8/1992 | Fite et al. | 712/204 |
| 5,189,319 | | 2/1993 | Fung et al. | 307/452 |
| 5,204,953 | | 4/1993 | Dixit | 395/400 |
| 5,254,888 | | 10/1993 | Lee et al. | 307/480 |
| 5,259,006 | | 11/1993 | Price et al. | 375/107 |
| 5,353,420 | * | 10/1994 | Zaidi | 712/210 |
| 5,404,473 | | 4/1995 | Papworth et al. | 395/375 |
| 5,408,626 | | 4/1995 | Dixit | 395/400 |
| 5,438,668 | * | 8/1995 | Coon et al. | 712/204 |
| 5,479,616 | * | 12/1995 | Garibay, Jr. et al. | 712/212 |
| 5,499,355 | * | 3/1996 | Krishnamohan et al. | 711/118 |
| 5,555,391 | * | 9/1996 | De Subijana et al. | 711/118 |

(List continued on next page.)

FOREIGN PATENT DOCUMENTS

| 0413434 | 2/1991 | (EP). |
| 0417013 | 3/1991 | (EP). |
| 0651322 | 5/1995 | (EP). |
| 9320507 | 10/1993 | (WO). |

OTHER PUBLICATIONS

Serra, Micaela & Dervisoglu, Bulent I, "Testing", Chapter 79, *The Electrical Engineering Handbook*, Richard C. Dorf, Editor–in–Chief, pp. 1808–1837, CRC Press.
L–T Wang et al., "Feedback Shift Registers For Self–Testing Circuits", *VLSI Systems Design*, Dec. 1986.
Masakazu Shoji, "CMOS Dynamic Gates", Chapter 5, *AT & T CMOS Digital Circuit Technology*, Prentice Hall, 1988, pp. 210–257.

(List continued on next page.)

*Primary Examiner*—Matthew Kim
*Assistant Examiner*—Pierre-Michel Bataille
(74) *Attorney, Agent, or Firm*—Stallman & Pollock LLP

(57) ABSTRACT

A pipelined processor in which the decoder can consume a portion of an instruction and hold that portion in sub-field shadow registers while retrieving the remainder of the instruction in a subsequent cycle or cycles. Each byte in a prefetch buffer is individually tagged such that the decoder can clear individual bytes in the prefetch buffer in order to allow additional instruction bytes to be prefetched before the current instruction is completely consumed and decoded by the decode stage. This allows for an optimal buffer size that is less than the maximum possible instruction length but large enough to hold a complete copy of the vast majority of instructions.

13 Claims, 8 Drawing Sheets

FIG. 1

U.S. PATENT DOCUMENTS

| | | | | |
|---|---|---|---|---|
| 5,689,672 | * | 11/1997 | Witt et al. | 712/213 |
| 5,768,575 | * | 6/1998 | McFarland et al. | 712/228 |
| 5,826,053 | * | 10/1998 | Witt | 712/210 |
| 5,887,152 | * | 3/1999 | Tran | 712/217 |

OTHER PUBLICATIONS

Guthrie, Charles, "Power–On Sequencing For Liquid Crystal Displays; Why, When, And How", *Sharp Application Notes*, Sharp Corporation, 1994, pp. 2–1 thru 2–9.

Bernd Moeschen, "NS32SP160—Feature Communication Controller Architecture Specification", *National Semiconductor*, Rev. 1.0, May 13, 1993.

Agarwal, Rakesh K., *80x86 Architecture and Programming*, vol. II: Architecture Reference, Chapter 4, Prentice Hall, 1991, pp. 542–543.

Intel486 Microprocessor Family Programmer's Reference Manual, Intel Corporation, 1993.

"8237A High Performance Programmable DMA Controller (8237A, 8237A–4, 8237A–5)", *Peripheral Components*, Intel, 1992, pp. 3–14 thru 3–50.

Kane, Gerry, "R2000 Processor Programming Model", Chapter 2, *MIPS RISC Architecture*, MIPS Computer Systems, Inc., 1989.

Hennessy, John, et al., "Interpreting Memory Addresses", *Computer Architecture A Quantitative Approach*, pp. 95–97, Morgan Kaufmann Publishers, Inc. 1990.

*PowerPC601 Reference Manual*, IBM, 1994, Chapter 9, "System Interface Operation", pp. 9–15 thru 9–17.

Intel Corp. Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3–28 thru 3–32, 1993.

32$^{nd}$ IEEE Computer Society International Conference, Feb. 23–27 1987, San Francisco, p. 322–327, MISHRA "The Vax 8800 Microarchitecture" p. 325 section "Instruction Buffer and Decoder".

* cited by examiner

TAGGED PREFETCH AND INSTRUCTION DECODER FOR VARIABLE LENGTH INSTRUCTION SET AND METHOD OF OPERATION

FIELD OF THE INVENTION

The invention pertains to the prefetch and decode stages of a pipelined microprocessor. More particularly, the invention pertains to a method and apparatus for prefetching and decoding variable length instructions using a tagged prefetch buffer smaller than the maximum allowable instruction width.

BACKGROUND OF THE INVENTION

Modem microprocessors employ pipelining techniques which allow multiple, consecutive instructions to be prefetched, decoded, and executed in separate stages simultaneously. Accordingly, in any given clock cycle, a first instruction may be executed while the next (second) instruction is simultaneously being decoded, and the instruction after that one (a third instruction) is simultaneously being fetched. Since less processing is performed on each instruction per cycle, cycle time can be made shorter. Thus, while it requires several clock cycles for a single instruction to be pre-fetched, decoded, and executed, it is possible to have a processor completing instructions as fast as one instruction per cycle with a very short cycle period, because multiple consecutive instructions are in various stages simultaneously.

Typically, buffers for temporarily holding data are used to define the boundary between consecutive stages of a microprocessor pipeline. The data calculated in a particular stage is written into these buffers before the end of the cycle. When the pipeline advances upon the start of a new cycle, the data is written out of the boundary buffers into the next stage where the data can be further processed during that next cycle.

Most pipelined microprocessor architectures have at least four stages including, in order of flow, 1) a prefetch stage, 2) a decode stage, 3) an execute stage, and 4) a write-back stage. In the prefetch stage, instructions are read out of memory (e.g., an instruction cache) and stored in a buffer. Depending on the particular microprocessor, in any given cycle, the prefetch buffer may receive one to several instructions.

In the decode stage, the processor reads an instruction out of the prefetch buffer and converts it into an internal instruction format which can be used by the microprocessor to perform one or more operations, such as arithmetic or logical operations. In the execute stage, the actual operations are performed. Finally, in the write-back stage, the results of the operations are written to the designated registers and/or other memory locations.

In more complex microprocessors, one or more of the four basic stages can be further broken down into smaller stages to simplify each individual stage and even further improve instruction completion speed.

Generally, instructions are read out of memory in a sequential address order. However, instruction branches, in which the retrieval of instructions from sequential address spaces is disrupted, are common, occurring on average about every six to nine instructions.

The hardware in an instruction prefetch stage typically comprises a prefetch buffer or prefetch queue which can temporarily hold instructions. Each cycle, the decode stage can take in the bytes of an instruction held in the prefetch stage for decoding during that cycle.

The hardware in a decode stage typically comprises at least a program counter and hardware for converting instructions into control lines for controlling the hardware in the execute stage. Alternately, the decode stage can include a microcode-ROM. The incoming instruction defines an entry point (i.e., an address) into the microcode-ROM at which the stored data defines the appropriate conditions for the execute stage control lines. The execute stage control data for the particular instruction may exist entirely at a single addressable storage location on the microcode-ROM or may occupy several sequentially addressable storage locations. The number of addressable storage locations in the microcode-ROM which must be accessed for a given instruction may be encoded in the instruction itself. Alternately, one or more data bits in the storage locations in the microcode-ROM may indicate whether or not another storage location should be accessed.

The control data output from the microcode-ROM is written into buffer registers for forwarding to the execute stage on the next cycle transition. The decode stage also includes hardware for extracting the operands, if any, from the instruction or from registers or memory locations and presenting the operands to the appropriate hardware in the execution stage.

Some microprocessor architectures employ what are known as variable width instruction sets. In such architectures, the instructions are not all the same width. For instance, in the instruction set for the 16/32 bit class x86 family of microprocessors developed by Intel Corporation of Santa Clara, Calif., an instruction can be anywhere from 1 to 16 bytes wide.

Some microprocessor architectures utilize a segmented address space in which the total memory space is broken down into a plurality of independent, protected address spaces. Each segment is defined by a base address and a segment limit. The base address, for instance, may be the lowest numerical address in the segment space. The segment limit defines the size of the segment. Accordingly, the end boundary of the segment is defined by the sum of the base address and the segment limit. Alternately, the base address may be the highest address and, as such, the end boundary of the segment would be the difference between the base address and the segment limit.

Software programs are written, compiled and assembled such that, when a program is running, instructions are normally retrieved from sequential addresses in memory for presentation into the pipeline. Accordingly, once a program is begun, the prefetch stage will normally continue to retrieve consecutive instructions for presentation to the decode stage from consecutive addresses in memory until that flow is interrupted. The most common way by which the sequential addressing of instructions can be interrupted is by a branch instruction. A branch instruction usually specifies, in some manner, the address from which the next instruction to be executed after the branch instruction is to be retrieved. Thus, when a branch instruction is executed in the execute stage, the execute stage halts the normal flow of instructions through the preceding stage of the pipe, e.g., the prefetch and decode stages, and instead supplies the next address for retrieving instructions to the prefetch stage. Accordingly, when a branch occurs, the instructions which had been retrieved from sequential addresses after the branch instruction which are in the pipe, i.e., the instructions in the prefetch and decode stages, should not be executed, but should be flushed from the pipe. The flow can be altered by mechanisms other than an executed branch instruction, such as an interrupt. Any change in program flow from sequential addressing is collectively referred to as a branch in this specification, even if it is not the result of a branch instruction.

To generate a linear address according to the x86 architecture, at the very least two quantities are added. Particularly, the base address of the particular segment, as indicated by the segment descriptor and an offset indicating the distance of the desired data (i.e., instruction) from the base of the segment must be added together. The offset itself may comprise up to three more parts, a base, index and displacement. If so, those quantities must be added to generate the offset before the offset could be added to the segment base. A more detailed discussion of segmented addressing in the x86 architecture can be found in *INTEL486 Microprocessor Family Programmer's Reference Manual*, 1992, Intel Corporation.

It is an object of the present invention to provide an improved pipelined microprocessor.

It is a further object of the present invention to provide a pipelined microprocessor architecture in which the prefetch line buffer has a line width less than the maximum possible instruction width in order to conserve semiconductor area, yet which is wide enough to accommodate the vast majority of instructions in a single line.

It is a further object of the present invention to provide a pipelined microprocessor architecture having a decode stage in which shadow buffers are used to temporarily store portions of instructions which are wider than the prefetch line buffer and therefore require multiple cycles to be loaded into the decode stage.

It is a further object of the present invention to provide a pipelined microprocessor architecture having a tagged prefetch buffer in which instruction bytes are individually tagged so that the prefetch buffer bytes can be cleared individually to allow data to be loaded more efficiently into the prefetch buffer.

It is a further object of the present invention to provide a pipelined microprocessor architecture having a decode stage in which dynamic information is decoded by hardware, while fixed information is decoded by use of an addressable ROM.

SUMMARY OF THE INVENTION

The invention relates to a method and apparatus for fetching and decoding variable length instructions in a pipelined processor. A prefetch line buffer defines the boundary between the prefetch stage and the decode stage. The decode stage pulls instruction bytes out of the line buffer for decoding. In order to conserve silicon space, the line buffer is less wide than the maximum possible instruction width. However, preferably, the line buffer is wide enough to accommodate the full instruction width of most instructions.

The decode stage includes a plurality of shadow buffers into which instruction bytes can be temporarily loaded and held in those situations where the instruction width is too wide to be loaded into the line buffer in a single cycle. Thus, part of the instruction can be loaded into the decode stage and the byte positions in the line buffer from which they were loaded can be cleared so that more instruction bytes can be prefetched. The remainder of the bytes of the instruction can be loaded into the line buffer and then into the decode stage on subsequent cycles, at which point the entire instruction, including the bytes newly loaded into the decode stage and the bytes stored in the shadow registers can be simultaneously decoded.

In a pipelined microprocessor embodying a preferred embodiment of the invention, an instruction may comprise up to three sub-fields, and each sub-field may comprise one or more bytes. Specifically, an instruction may include a prefix sub-field comprising one or more prefix bytes which indicate dynamic information such as the length of the address or data for that instruction, or whether the bus is to be locked during that instruction. The number of prefix bytes is variable, and, in the preferred embodiment can be anywhere from zero to fourteen bytes. The prefix sub-field, if any, is followed by the op-code sub-field, which may comprise one to three bytes. All instructions comprise at least one op-code byte. Finally, the op-code sub-field is followed by the constant data sub-field. The constant data sub-field can comprise one or two operands depending on the particular instruction. Depending on the number of constants and the size of each constant, the constant sub-field can be up to eight bytes in length. Many instructions do not include any constants.

The decode stage includes an instruction pointer into the line buffer which generates a demand instruction pointer (DIP), a temporary instruction pointer (TIP) and a next instruction pointer (NIP). The DIP holds the linear address of the first byte of the instruction currently in the decode stage. The x least significant bits (LSBs) of the DIP, where $2^x$ is the width of the line buffer, identify the particular byte position in the line buffer of this byte. The TIP holds the address of the first instruction byte which has not yet been consumed by the decode stage. The x LSBs of the TIP point to the byte position in the line buffer of the first instruction byte which has not yet been consumed by the decode stage. The TIP will be the same as the DIP at the beginning of an instruction. The NIP holds the address of the first byte of the next instruction which will be loaded into the decode stage. The LSBs of the NIP point to the byte position in the line buffer of the first byte of the next instruction which will be loaded into the decode stage. A fourth pointer, TIPSHIFT, points to the address to which the TIP will be updated when the decode stage consumes bytes during a cycle. A fifth pointer, TIPOPLEN, points to the address of the first byte of the constant sub-field, if any.

Each byte in the line buffer is individually tagged with a valid bit indicating whether the data in that byte position in the line buffer is valid data to be loaded into the decode stage for decoding. Once a byte in the line buffer is actually loaded into the decode stage, its tag byte is reset so that the prefetch stage can prefetch and load another instruction byte in that byte position. Every time the TIP is updated, the valid bits of the bytes traversed by the TIP are reset.

The decode stage further includes a prefix flag register, prefix flag setting logic, op-code data extraction logic and constant data extraction logic. Each cycle, the inputs to the op-code data extraction unit are the three bytes following the TIP position in the line buffer. The op-code extraction logic includes circuitry for determining if the first of the three bytes is a prefix byte or an op-code byte. If the first byte is a prefix byte and it is tagged valid, TIPSHIFT is set to one and the prefix byte is forwarded to the prefix flag setting logic. The prefix flag setting logic sets an appropriate flag in the prefix flag register responsive to the prefix byte. The TIP is then updated (e.g. incremented by TIPSHIFT) and the process continues. Only one prefix byte per cycle is operated on by the decode stage.

When the first byte pointed to by the TIP is an op-code byte, the bytes are processed differently.

In particular, the data extraction unit includes logic for very quickly pre-decoding the op-code sub-field to determine the length of the op-code and constant data, if any, for that instruction. The op-code length is added to the TIP in order to generate the TIPOPLEN pointer. The op-code length and the length of the first operand in the constant data field are added to the TIP in order to generate the TIPSHIFT pointer. The constant data extraction unit loads the four bytes of data following the last byte of the op-code. Until it is determined that it has received valid bytes for the entire op-code sub-field and the first constant data, if any, the TIP pointer is not updated. If all of the bytes in the op-code sub-field and all of the bytes of the first operand in the constant data sub-field, if any, are tagged valid, the op-code extraction logic forwards the op-code sub-field bytes to an op-code assembly circuit and the constant data extraction unit forwards the constant sub-field bytes to an appropriate data port depending on the type of the constant data (e.g. immediate or displacement).

If the instruction had less than two operands, the op-code assembly circuitry iunmediately forwards the op-code bytes to address generation logic and control decode logic for decoding and the data port sends the operand data to decode stage buffers for loading into the execute stage in the next pipeline cycle. When the constant data sub-field includes two operands, the op-code and first constant are stored in shadow registers in the op-code assembly unit and the data port, respectively. The second constant is pulled out of the line buffer in a subsequent cycle and forwarded through the constant data extraction logic to another data port. During that subsequent cycle, the op-code sub-field and the first operand as well as the newly retrieved second operand are propagated through the decode stage.

The constant data extracted by the constant data extraction unit and loaded into the appropriate port or ports essentially is ready for forwarding to the execute stage without flurther processing. However, the op-code bytes extracted by the op-code data extraction unit and passed through the op-code assembly unit must first be decoded. Control decode logic and a microcode-ROM, responsive to the op-code byte or bytes, generate control signals for the execute stage which control the execute stage to perform the specified instruction. The control decode logic generates the control signals relating to dynamic information, such as the address and data lengths used by the instruction and whether the bus should be locked during execution of the instruction. The microcode-ROM generates the control signals relating to fixed operations such as the actual ALU operation to be performed (add, subtract, multiply, XOR, etc.) and the source and destination of data.

The above-described architecture is designed to perform multiple functions as simply and quickly as possible so that a substantial amount of instruction decoding can be performed in a single cycle.

DETAILED DESCRIPTION OF A PREFERRED INVENTION

Overview of Architecture

The prefetch method and apparatus of the present invention is particularly adapted for use in a microprocessor having a variable width instruction set and more particularly a microprocessor using the instruction set for x86 microprocessors. However, the invention has broader application to any type of processor.

Figure 1:
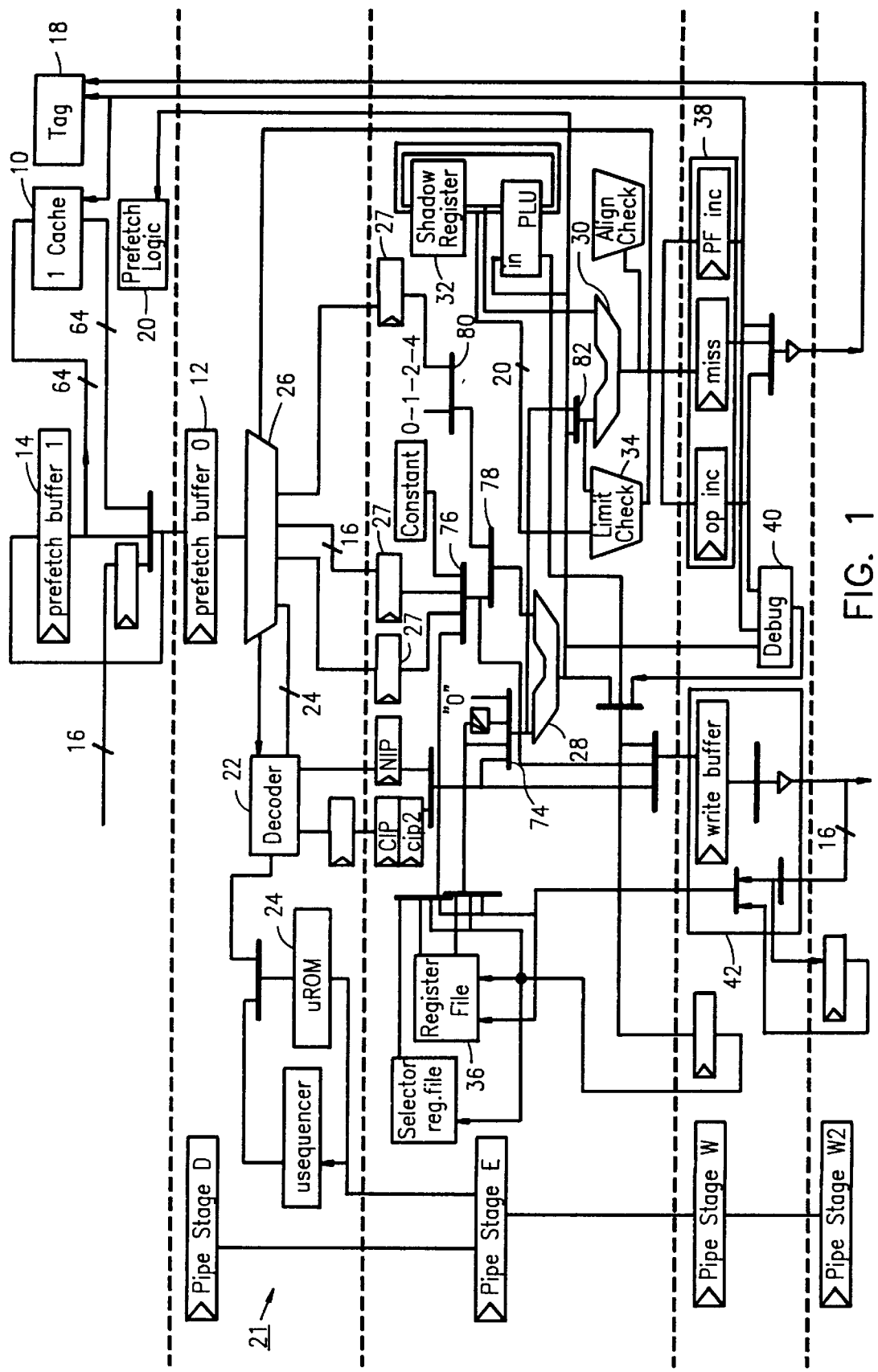
FIG. 1 is a high level block diagram of a pipelined processor constructed according to a preferred embodiment of the present invention.

FIG. 1 is a block diagram generally illustrating the various pipeline stages of a microprocessor according to a preferred embodiment of the present invention. As shown, the microprocessor is pipelined into five stages, namely, 1) a prefetch stage, 2) a decode stage, 3) an execute stage, 4) a write-back stage, and 5) a second write-back stage.

As shown, the prefetch stage includes two prefetch buffers 12 and 14. Prefetch buffer 12 is the line buffer from which the decode stage pulls instruction bytes. It is the only data interface between the prefetch and decode stages. The prefetch stage also includes a 1 kilobyte instruction cache 16 and a cache tag memory 18 for storing tag data related to the data in the instruction cache 16. The instruction cache is direct mapped with a line size 8 bytes wide. Both prefetch buffers also are 8 bytes wide, containing byte positions 0 (least significant byte) through byte position 7 (most significant byte). The prefetch stage also includes prefetch logic 20 for performing various functions relating to the control of the loading of the prefetch buffers with instructions.

Figure 2:
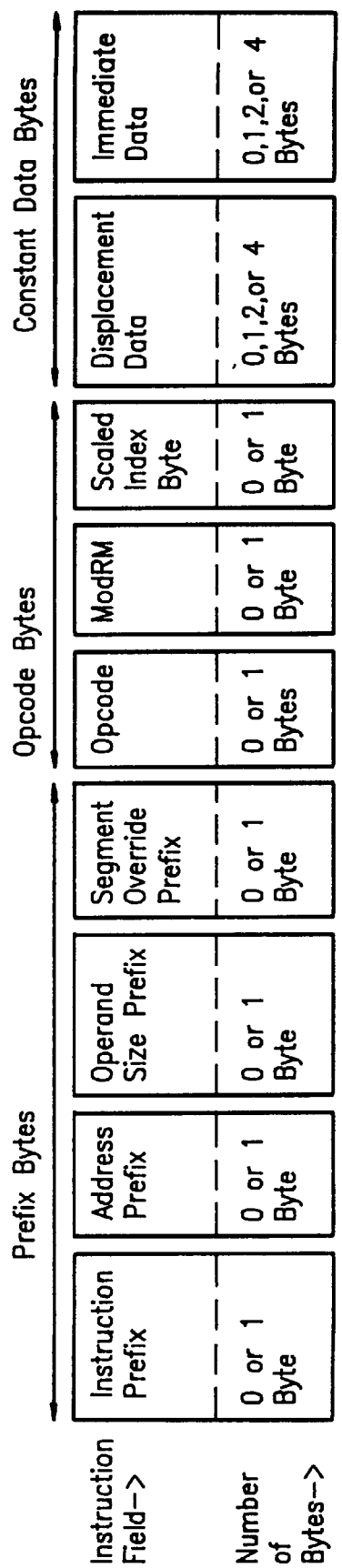
FIG. 2 is a block diagram illustrating the various possible sub-fields and individual bytes of an instruction used in a microprocessor constructed according to a preferred embodiment of the present invention.

Referring to FIG. 2, all instructions in the x86 instruction set are considered herein to be comprised of up to three sub-fields, each sub-field having several possible byte widths. The three possible sub-fields are the prefix sub-field, the op-code sub-field, and the constant sub-field. Every instruction comprises at least an op-code sub-field. The opcode sub-field defines the function which the execute stage is to perform with respect to that instruction (e.g. add, subtract, multiply, XOR, data movement, etc.). The op-code sub-field can be 1, 2 or 3 bytes in length. The op-code sub-field will always include an op-code byte defining the function to be performed. It may also include a MODRIM byte. The MODR/M byte is an addressing mode specifier. It specifies whether an operand is in a register or memory location and, if in memory, it specifies whether a displacement, a base register, an index register, and scaling are to be used. When the MODR/M byte indicates that an index register will be used to calculate the address of an operand, the instruction may comprise a third byte, termed the scaled index byte (SIB). The SIB byte is included in the instruction to encode the base register, the index register and a scaling factor.

Certain instructions also include a third sub-field, the constant data sub-field. The constant data sub-field can specify one or two operands used by the instruction. Specifically, the constant data sub-field may comprise 1) a displacement data operand, 2) an immediate date operand, 3) a displacement data operand and an immediate data operand, or 4) two immediate data operands. When the addressing mode is one in which a displacement will be used to compute the address of an operand, the instruction includes a displacement data operand as part of the constant sub-field. A displacement data operand can be 1, 2 or 4 bytes in length. An immediate operand directly provides the value of an operand. An immediate operand may be 1, 2 or 4 bytes in length. Accordingly, the constant sub-field, if any, can be 1, 2, 3, 4, 5, 6, or 8 bytes wide.

Certain parameters, such as the segment register to be used by instructions, the address size and the operand size, are set to default conditions in the execute and/or decode stages. These parameters, however, can be overridden by prefix bytes in the prefix sub-field of an instruction. There are four basic types of prefix bytes, namely; an address prefix for selecting between 16 or 32 bit addressing, 2) an operand size prefix byte for selecting between 16 or 32 bit data size, 3) a segment override byte which specifies the segment register an instruction should use, and 4) an instruction prefix which can toggle between two states which determine the table from which the op-code byte is decoded. Accordingly, the use of the instruction prefix essentially doubles the possible number of instructions. Because a particular prefix byte type, e.g., address prefix, can appear more than once in a single instruction, there can be anywhere from 0 to 14 prefix bytes in an instruction.

Referring back to FIG. 1, the execute stage executes the instructions. It also computes memory addresses for purposes of fetching operands out of memory. With respect to branch instructions, it computes and outputs linear memory addresses which are returned to the prefetch stage for fetching instructions. A branch instruction usually includes an operand which specifies the address location to which instruction flow is to jump. The branch address can be specified as a relative address (by providing the number of addresses or bytes from the present address to the branch address) or as a more complex value which must be calculated from the operands in the branch instruction and/or other data).

Alternately, the operand might specify a register or memory location from which the address or a portion of the address is to be fetched. The operand might also specify a direct offset address from which the linear address can be generated by adding in the base address of the current segment. Any number of other methods could be used also.

The x86 architecture uses a segmented address space and has several complex addressing modes. To generate a physical address according to the x86 architecture, at the very least, two quantities must be added. Particularly, the base address of the particular segment and a value indicating the distance of the desired data from the base of the segment (a segment offset value) must be added. The segment offset value itself may comprise up to three more parts, namely, a base, an index, and a displacement.

In order to keep the architecture simple and inexpensive yet allow most addresses to be computed in a single cycle, the execute stage employs two adders so that two address additions can be performed in one cycle. Accordingly, all addresses which have only a scaled index and a displacement or a base and a displacement can be calculated in a single cycle. During branch instructions, a first adder 28 generates the segment offset by adding the necessary values. The two particular values which are added, of course, depend on the particular instruction, and are selected by multiplexers 74, 76, 78 and 80. The second adder 30 adds the calculated segment offset from the first adder to the segment base in order to generate the linear address. The segment base is supplied from the shadow register 32 of the execute stage. The linear address is then used to fetch instructions into the prefetch stage.

The execute stage also includes a register file 36 which is used to resolve the source and destination information for all operations in the execute stage.

The write-back stage includes the bus interface unit 38, debug logic 40 and register write-back logic 42. A second write-back stage is provided for special cases and allows completion of an independent register operation out of order while a memory write access is still pending.

Prefetch

When prefetching instructions for decoding, program instruction retrieval normally flows sequentially through the address space. However, jumps in instruction flow from one address to a non-consecutive address are extremely common, the most typical such occurrence being when a branch occurs in program flow. Interrupts also causes branch instruction flow. When a branch occurs, it may take several cycles before an address can be generated, provided to memory, and the instruction retrieved. Accordingly, it is not always possible to fetch instructions and provide them to the prefetch stage quickly enough so that the decode stage has a waiting instruction to decode each cycle. Such down-time obviously deteriorates the overall performance of a microprocessor. Accordingly, it is desirable to keep the line buffer in the prefetch stage as full as possible with instructions to be decoded and executed. Therefore, when a branch or other event occurs which requires an extended number of cycles to fetch an instruction, the decoder can continue to pull instructions out of the line buffer and continue decoding instructions during these periods.

The pipelined microprocessor of the present invention utilizes a two tier prefetch buffer architecture. As previously noted, the microprocessor of the preferred embodiment of the invention has a one kilobyte instruction cache. Thus, instructions can be prefetched from the instruction cache 16 from an external memory. The line buffer 12 is the boundary between the prefetch stage and the decode stage and is the buffer from which the decode stage pulls instructions for decoding. Secondary prefetch buffer 14 is a second tier buffer which temporarily holds instructions retrieved from memory (external memory or cache memory) during cycles in which the line buffer 12 does not have space for some or all of the retrieved instruction bytes.

As will be described in greater detail below, in the preferred embodiment of the invention, the decode stage can pull out a maximum of seven instruction bytes per cycle. from the line buffer 12. Specifically, the decode stage decodes, per cycle, (1) one prefix byte or (2) an op-code sub-field (of up to three bytes) and the first operand in the constant data sub-field (of up to four bytes), if any or (3) the second operand in the constant data sub-field (of up to four bytes). Accordingly, an instruction which has two operands in its constant data sub-field requires at least two cycles to be executed and possibly more if the instruction has any prefix bytes.

Figure 3:
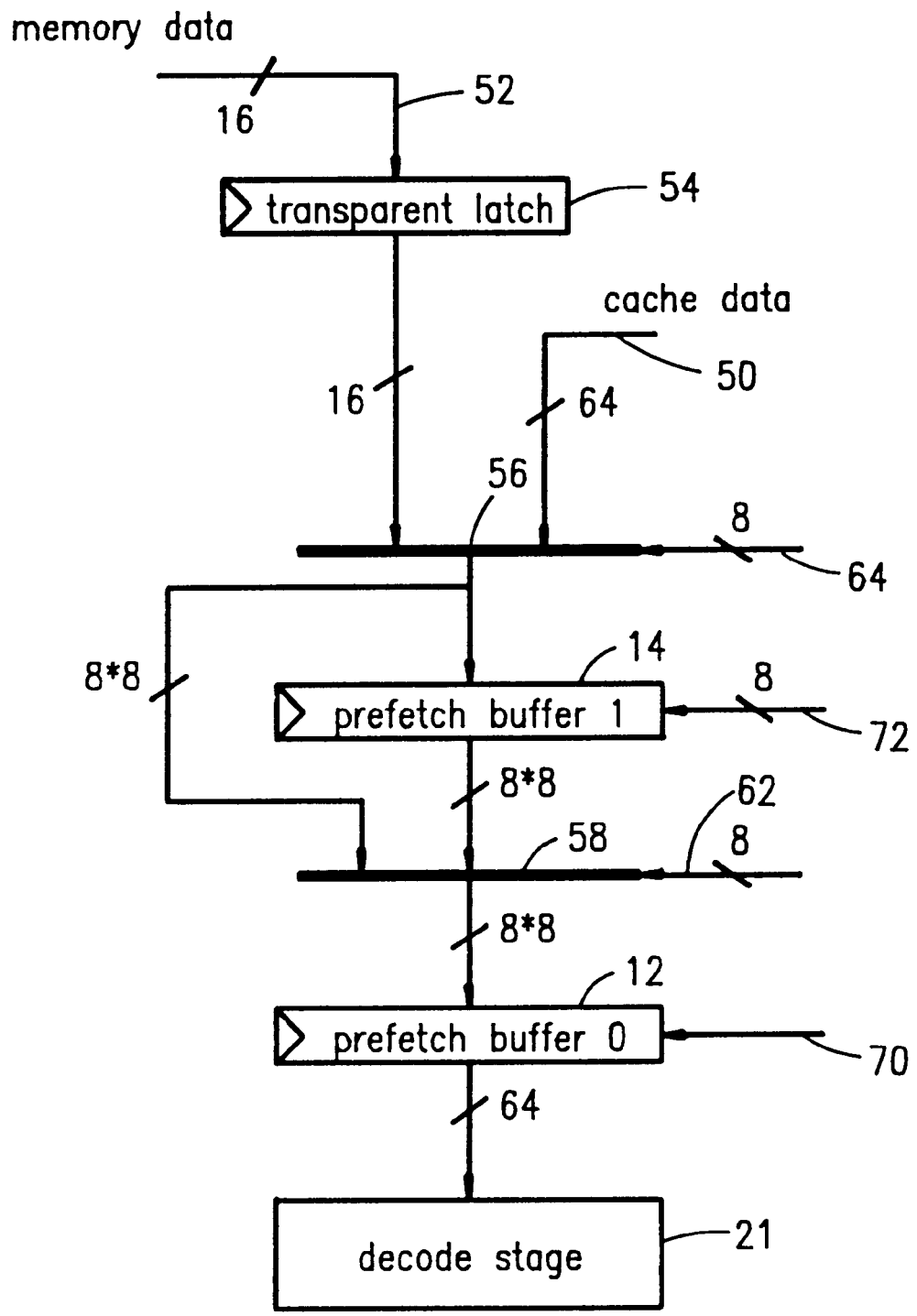
FIG. 3 is a more detailed block diagram of the components of a prefetch stage, including the line buffer, of a microprocessor constructed according to a preferred embodiment of the present invention.

FIG. 3 shows a logical representation of the two tier prefetch stage apparatus according to a preferred embodiment of the present invention. The provision of a two tier prefetch buffer helps keep the line buffer 12 as full as possible on each cycle and, thus, helps avoid pipeline stalls caused the unavailability of instructions in the line buffer 12 for the decode stage to decode.

The decode stage pulls instructions for decoding only out of the line buffer 12. Accordingly, line buffer 12 is the data interface between the prefetch stage and the decode stage. Prefetch buffer 14 is a secondary buffer into which retrieved instruction bytes which cannot be loaded directly into the line buffer 12 are stored. The instruction bytes loaded into secondary buffer 14 are held there until space becomes available in the line buffer 12, at which time the bytes are loaded from the secondary buffer 14 into the line buffer 12.

More specifically, as instruction bytes are returned from memory, they are loaded into byte positions within the buffers 12 and 14 which are dictated by their addresses. Particularly, the 3 LSBs of the address dictate the byte position in the 8 byte wide buffers into which the instruction byte should be loaded. Accordingly, each byte returned from memory can be loaded into only one byte position in each buffer. Loading instruction bytes into the prefetch buffers in this manner substantially simplifies circuitry throughout the processor. Cache line and prefetch buffer widths of 8 bytes are preferred because it achieves a substantial reduction in semiconductor area as compared to prior art architectures in which the prefetch buffer (or queue) is as wide as the maximum possible instruction width or wider. However, it is still wide enough to accommodate the vast majority of instructions in a single line. This allows the vast majority of instructions to be loaded into the decode stage and decoded in a single cycle.

Instructions are returned to the prefetch stage, either on line 50 from the instruction cache or on line 52 from external memory, responsive to a memory request. The prefetch stage includes a transparent latch 54 for timing purposes. It also includes multiplexers 56 and 58.

The instruction bytes returned from memory (either external memory or cache memory) are loaded directly into the line buffer 12, if the appropriate byte position in line buffer 12 is available. Those instructions bytes for which space does not currently exist in the line buffer 12 are loaded into the corresponding byte position in secondary prefetch buffer 14. An instruction byte held in secondary prefetch buffer 14 will be loaded into the line buffer 12 when the corresponding byte position in the line buffer 12 becomes available (i.e., when the decode stage consumes the instruction byte that is currently occupying that byte position in the line buffer).

Each byte position in the prefetch buffers has associated with it a valid tag bit indicating whether or not the data contained in the corresponding byte position of the buffer is a valid instruction byte which is to be decoded. The valid tag bits are used to determine which byte positions are available for loading of incoming instruction bytes from memory and which byte positions are occupied by valid instruction bytes to be decoded and, therefore, cannot be overwritten with incoming instruction bytes.

The clock enable signals 70 and 72 of prefetch buffers 0 and 1, respectively, and the select control lines 62 and 64 of multiplexers 58 and 56, respectively, are used to direct the instruction bytes returned from memory into the appropriate prefetch buffer 12 or 14. Multiplexers 56 and 58 are each 8 bytes wide, which is the same width as the cache lines and the prefetch buffers. Multiplexers 56 and 58 also each have 8 select control lines 64 and 62, respectively, so that each byte can be individually selected. Also, each byte of the prefetch buffers 12 and 14 can be individually enabled by a separate clock enable signal. Accordingly, the clock enable signals 72 and 70 of prefetch buffers 12 and 14, respectively, also are 8 bits wide.

The select control lines 64 and 62 of multiplexers 56 and 58, respectively, and the clock enable signals 70 and 72 of prefetch buffers 12 and 14, respectively, are controlled in accordance with the following scheme to assure proper loading of data. As instructions are fetched from the cache or external memory, all bytes in byte positions for which there is room in the line buffer 12 (i.e., for which the corresponding byte positions in line buffer 12 are tagged invalid) are loaded directly into the line buffer 12, bypassing secondary buffer 14. Simultaneously, valid instruction bytes in secondary buffer 14 which are in byte positions corresponding to an invalid tagged byte position in line buffer 12 are loaded from secondary prefetch buffer 14 into line buffer 12. Valid bytes from memory and valid bytes from secondary prefetch buffer 14 will never co-exist in the same byte position since a memory request would not have been made unless the data in secondary prefetch buffer 14 in the byte position corresponding to the incoming data from memory was tagged invalid. In other words, a memory request would not be made by the prefetch stage unless there was room in the secondary prefetch buffer 14 for the returned data.

Those instruction bytes returned from memory for which room does not presently exist in line buffer 12 are loaded into secondary prefetch buffer 14. After each fetch, the valid tag bits of both buffers are updated. This updating operation includes consideration of not only the bytes which were loaded into buffers 12 and 14 during that cycle, but also those bytes in line buffer 12 which were consumed by the decoder during that cycle and, therefore, can be reset from valid to invalid. A more detailed disclosure of the prefetch stage of the microprocessor of the present invention can be found in U.S. patent application Ser. No. 08/445,569 (now U.S. Pat. No. 5,680,564 issued Oct. 21, 1997), entitled "Two Tier Prefetch Structure And Method With Bypass", (Attorney Docket No. NSC1-65000) filed on even date herewith and incorporated herein by reference.

Decode

Figure 4:
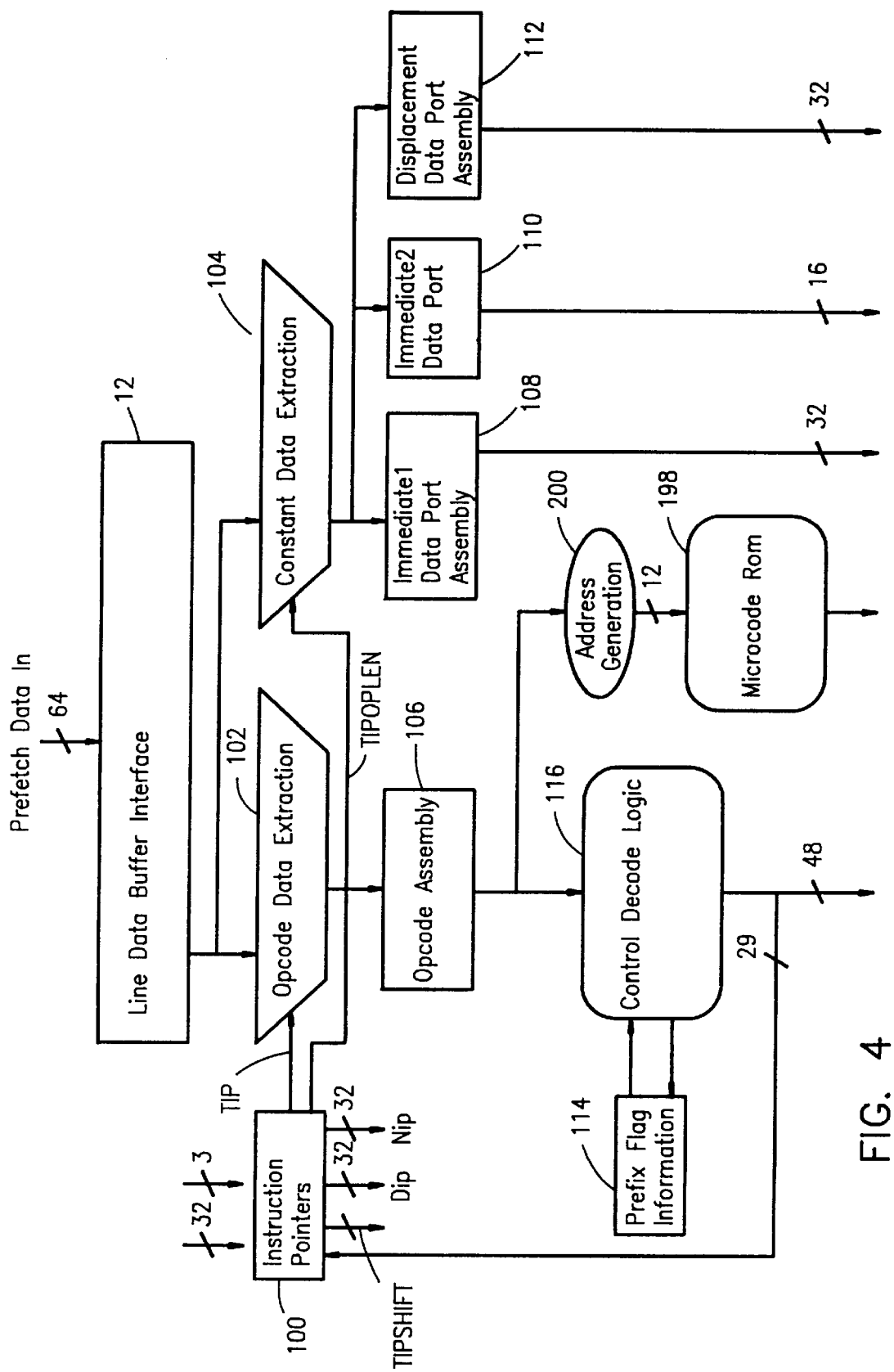
FIG. 4 is a high level block diagram of the decode stage of a microprocessor constructed according with a preferred embodiment of the present invention.

FIG. 4 is a high level block diagram of the decode stage of a pipelined microprocessor according to a preferred embodiment of the invention. The line buffer 12 is shown at the top of the diagram. The decode stage pulls instruction bytes out of byte positions in the line buffer 12 as dictated by a series of instruction pointers generated by instruction pointer generating circuit 100. The instruction pointers include a demand-instruction pointer (DIP), a temporary instruction pointer (TIP), an op-code length pointer (TIPOPLEN), and a shift pointer (TIPSHIFT). The DIP is generated each cycle to point to the linear address of the first byte of the instruction currently being operated on by the decode stage. The three least significant bits of the DIP identify the particular byte position in the line buffer at which that first instruction byte exists (because the buffer width is 8 or $2^3$ bytes). The TIP is generated each cycle to point to the first byte of the instruction which has not yet been consumed by the decode stage. The three LSBs of the TIP point to the byte position in the line buffer 12 of the first byte of the instruction which has not yet been consumed. The TIP will be the same as the DIP at the beginning of an instruction. The TIPOPLEN pointer is set to the sum of the TIP pointer and the op-code length so that it points to the first byte of constant data. The three LSBs of the TIPOPLEN point to the byte position in the line buffer 12 of the first byte of constant data, if any, of the instruction. The TIPSHIFT pointer points to the address to which the TIP will be updated when the decode stage consumes bytes. The 3 LSBs of TIPSHIFT point to byte position in the line buffer of the byte to which the TIP will be updated. As will become clear, TIPSHIFT is controlled to be one of the following depending on the portion of an instruction that is currently being operated on by the decode stage. Particularly, TIPSHIFT will be (1) one, (2) the TIP pointer plus the length of the op-code sub-field and the first operand, if any, of the instruction currently in the decode stage, or (3) the TIP pointer plus the length of the second operand of the instruction currently in the decode stage.

The prefetch stage loads the line buffer and the decode stage consumes bytes from the line buffer in a circular queue fashion. In other words, the pointers are updated in a consecutive fashion from byte 0 through byte 7, and when byte 7 is consumed, the pointers wrap around back to byte 0. For instance, if a 4 byte instruction starts at byte position 6 in line buffer 12, the next byte for that instruction appears at byte position 7, the one after that appears at byte position 0, and the last one appears at byte position 1.

In the terminology of this specification, bytes are "consumed" by the decode stage when they are passed through the data extraction circuits 102 and 104 to the op-code assembly circuit 106 and/or constant data ports 108, 110 and 112, where they are either decoded or stored in shadow registers as described more fully below.

If an instruction has any prefix bytes, they are consumed one per cycle. All op-code bytes as well as all bytes of the first operand in the constant sub-field, if any, are consumed simultaneously in one cycle following the decoding of the last prefix byte. If there is a second operand in the constant sub-field, all of its bytes are consumed simultaneously in a subsequent cycle.

The decode stage comprises an op-code data extraction circuit 102. It is an 8 byte to 3 byte extraction circuit. It takes in all 8 bytes from the line buffer 12 and selects the byte position in the line buffer pointed to by the TIP pointer and the two following bytes in a circular queue fashion. The op-code extraction circuit 102 includes circuitry for quickly determining if the first byte pointed to by the TIP pointer is an op-code byte or a prefix byte.

If it is a prefix byte and it is tagged valid, it is forwarded to op-code assembly circuit 106, where it is directed into prefix decoding logic in control decode logic circuit 116. Control decode logic 116 sets a flag in prefix flag register 114 corresponding to the information conveyed by the prefix byte. If the byte position in the line buffer 12 pointed to by the TIP is not tagged valid, the decode stage simply stalls until a subsequent cycle in which it is tagged as valid.

Figure 5:
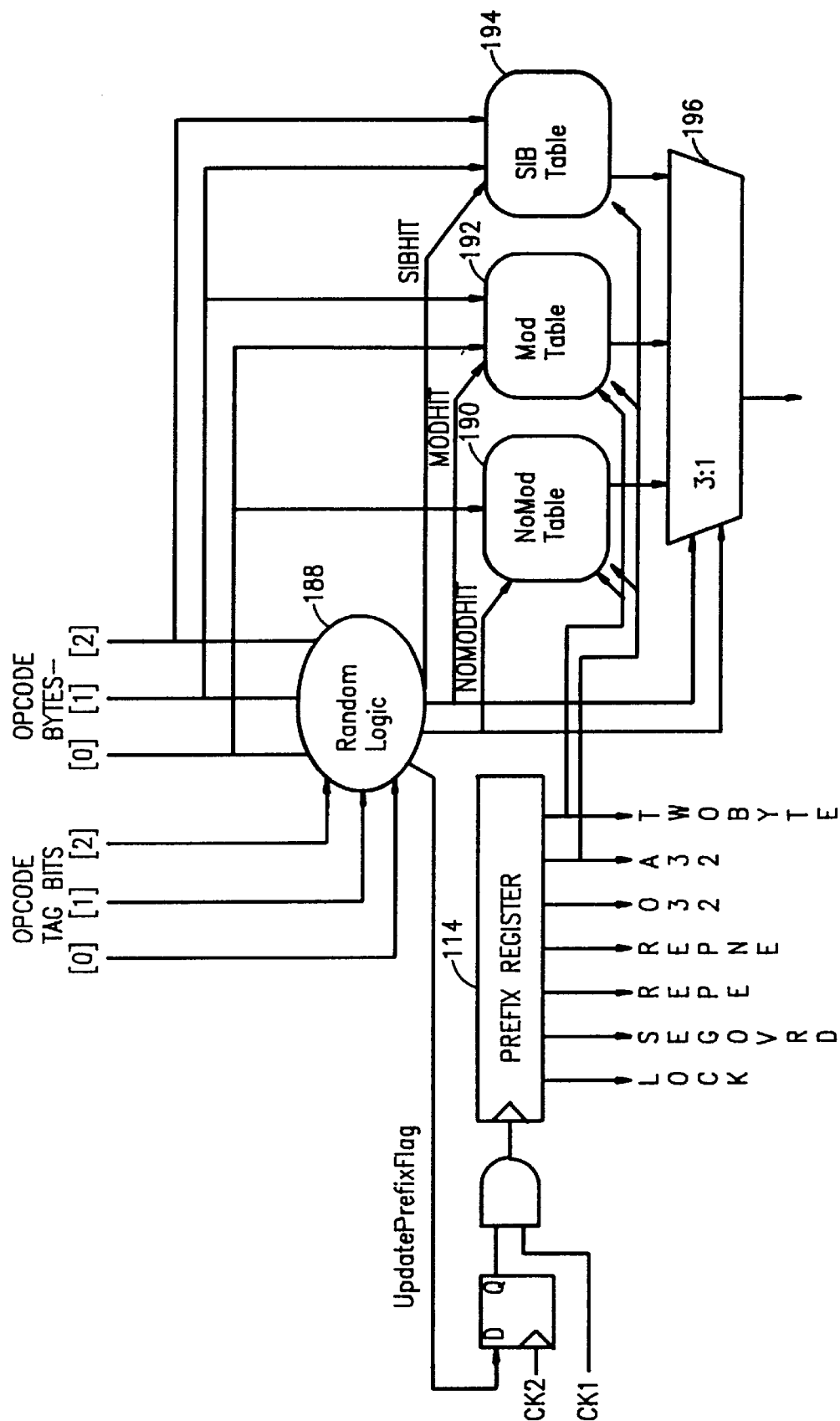
FIG. 5 is a more detailed block diagram of the control decode logic unit shown in FIG. 4 according to a preferred embodiment of the present invention.

Prefix register 114 is shown in more detail in FIG. 5. As shown, it is 7 bits wide and keeps track of dynamic information relating to the instruction in the decode stage. Particularly, the LOCK bit indicates whether or not the bus is to be locked during that instruction. The SEGOVRD bit indicates whether or not an override segment should be used for addressing during that instruction and identifies the particular segment to be used. Repeat is Equal (REPE) and Repeat is not Equal (REPNE) relate to string instructions in the x86 architecture. O32 indicates whether the data for the instruction is 16 or 32 bits wide. A32 indicates whether addressing for that instruction uses 16 or 32 bit wide addresses. Finally, the TWO BYTE bit indicates whether the op-code is a one or two byte op-code. All seven of the parameters controlled by the prefix register have default values to which the register is reset at the beginning of every instruction. If a prefix byte indicates dynamic information other than the corresponding default condition contained in the prefix flag register, the prefix flag register is rewritten with the new information.

Returning to FIG. 4, after the prefix byte is consumed, the TIP is incremented by one. This process is followed for each prefix byte in an instruction until the first byte in the op-code data extraction circuit 102 is an op-code byte, rather than a prefix byte.

When the first byte in the op-code extraction circuit 102 (i.e., the byte position pointed to by the TIP) is tagged valid and is an op-code byte, the bytes are processed differently. In particular, the op-code extraction unit 102 includes logic for very quickly pre-decoding the op-code field to determine whether the instruction includes constant data, whether the constant data comprises one or two operands, and the width of the op-code and each operand. The op-code width is added to the TIP in order to generate a TIPOPLEN pointer, which is used to load the constant data extraction unit 104 with the four bytes of data following the last byte of the op-code. Unless the op-code data extraction unit 102 determines that it has received valid bytes for the entire op-code sub-field and the first operand in the constant data sub-field, if any, it does not update the TIP.

If the instruction includes constant data, then constant data extraction unit 104 becomes relevant. Constant data extraction unit 104 is an 8 byte to 4 byte extractor which extracts the byte in the byte position in the line buffer pointed to by the TIPOPLEN pointer and the three consecutive following bytes (in modulo 8 arithmetic). The constant data extraction circuit 104 checks the valid bits corresponding to the first operand (which can be one, two or four bytes wide, as previously noted). When all the bytes of the op-code sub-field and all bytes of the first operand in the constant sub-field, if any, are tagged valid, the op-code extraction unit 102 consumes the op-code sub-field bytes by forwarding them to an op-code assembly circuit 106 and the constant data extraction circuit 104 consumes the first operand bytes by forwarding them to data port 108, if it is immediate data, or data port 112, if it is displacement data.

The TIP is now incremented by the number of bytes consumed, i.e., up to the location pointed to by the TIPSHIFT pointer. The three LSBs of the TIP pointer circularly address the line buffer. If the instruction was one having no constant data or only one operand in the constant data sub-field (so that the instruction has now been completely consumed), the DIP pointer is loaded with the TIP pointer value so that the DIP and TIP pointers both now point to the beginning of the next instruction. If, however, the instruction is one which includes a second operand, the DIP pointer is unchanged and the TIP pointer is updated to the TIPSHIFT pointer value. When the DIP and TIP pointers have been updated in this manner, the TIPOPLEN pointer is set equal to the TIP pointer (rather than TIP pointer plus op-code width) and TIPSHIFT is updated to the address of the first byte of the next instruction, i.e., to the NIP pointer value. The constant data extraction circuit 104 now takes in the next four bytes.

When all of the bytes of the second operand (which may be one, two or four bytes wide) are tagged valid, those bytes are consumed by the decode stage, i.e., forwarded to the immediate two data port 110. Also, the TIP pointer is incremented to the first byte of the next instruction and the DIP pointer is loaded with the new TIP pointer value.

Figure 6:
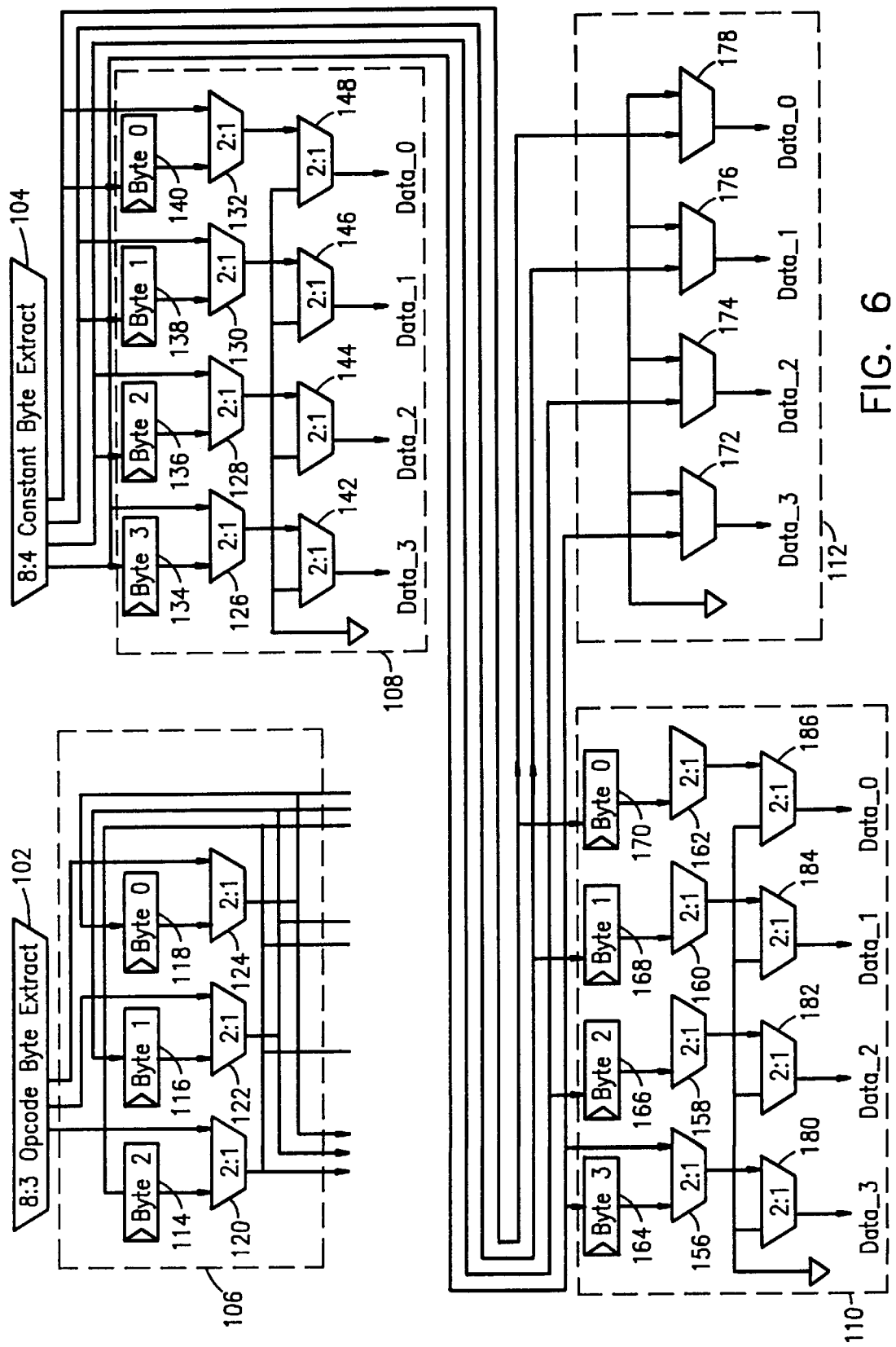
FIG. 6 is a more detailed block diagram of the op-code assembly unit, immediate one data port assembly unit, displacement data port assembly unit and immediate two data port assembly unit shown in FIG. 4 according to a preferred embodiment of the present invention.

FIG. 6 is a more detailed block diagram of the op-code assembly circuit 106, immediate one data port assembly circuit 108, immediate 2 data port assembly circuit 110 and displacement data port assembly circuit 112.

Referring first to op-code assembly circuit 106, it comprises three one byte wide shadow registers 114, 116 and 118 and three 2:1 multiplexers 120, 122 and 124. The first input terminals of the multiplexers 120, 122, 124 are coupled to receive the output of the corresponding shadow register 114, 116, 118. The second input terminals of the multiplexers are coupled to receive the corresponding byte directly out of the op-code extraction circuit 102. Basically, once the prefix bytes have been decoded and the prefix flag register updated, if the instruction has less than two operands in the constant data sub-field, then it can be extracted and decoded in the same cycle. In such situations, when the op-code byte or bytes and constant byte or bytes, if any, of the instruction are all valid, multiplexers 120, 122 and 124 select their second inputs so as to pass through the bytes directly from the op-code extraction circuit 102 to be decoded. If, however, the instruction includes a second operand, then the decode stage does not consume the entire op-code sub-field and constant sub-field in a single cycle since the constant data extraction circuit 104 does not extract two operands simultaneously. Accordingly, when the instruction includes two operands, the op-code byte or bytes are loaded into shadow register 114, 116, 118 through the second inputs of the multiplexers 120, 122 and 124 and the paths shown connecting the outputs of the multiplexers to the shadow registers. The op-code bytes will be held in these shadow registers until the remainder of the instruction (i.e., the second operand) can be loaded into the decode stage in a subsequent cycle. During the cycle in which the second operand is consumed, all of the op-code sub-field bytes can be read out of the shadow buffers 114, 116 and 118 through the first input terminals of multiplexers 120, 122, and 124 simultaneously with the forwarding of the two operands to the remaining decode stage circuitry for decoding and presentation to the execute stage.

The handling of the first operand in the constant sub-field by the immediate one data port 108 and displacement data port 112 is essentially the same as described above with respect to the op-code assembly circuit 106 except that an alternate arrangement of the 2:1 multiplexers with respect to the shadow buffers is illustrated in order to show an alternate way of achieving a similar goal. Particularly, if the instruction includes only one operand and it is an immediate operand, 2:1 multiplexers 126, 128, 130 and 132 are controlled to select their second inputs so as to receive the data directly out of the constant extraction circuit 104 and forward it to the remaining decode stage circuitry. However, if there is a second operand, the immediate data is loaded into shadow registers 134, 136, 138, and 140. On a subsequent cycle, the second operand is extracted and multiplexers 126, 128, 130 and 132 are controlled to select their first input so as to output the data in the shadow registers 134, 136, 138 and 140.

If, on the other hand, the first operand is displacement data, immediate one data port 108 does not operate. Instead, displacement data port 110 operates. Particularly, if there is only one operand, multiplexer 156, 158, 160 and 162 are controlled to select their second inputs so as to receive the data directly out of the constant data extraction circuit 104 and forward it to the-remaining decode stage circuitry. However, if there is a second operand, the displacement data is loaded into shadow registers 164, 166, 168 and 170 and, on a subsequent cycle, the second operand is extracted and multiplexers 156, 158, 160 and 162 are controlled to select their first inputs so as to output the data in the shadow registers 164, 166, 168 and 170.

As shown, both the immediate one assembly port 108 and the displacement assembly port 110 include a second layer of two to one multiplexers 142, 144, 146, 148 and 180, 182, 184, 186, respectively. Since both the immediate one assembly port 108 and the displacement assembly 110 operate exactly the same, the function and operation of these multiplexers will described with respect to the immediate one assembly port 108 only. Particularly, each of the multiplexers 142, 144, 146 and 148 have a first input coupled to ground and a second input coupled to the output of the preceding row of two to one multiplexers 126, 128, 130 and 132. As previously noted, the operand data can be one, two or four bytes wide. If the data is four bytes wide, then all of multiplexers 134, 136, 138 and 140 select their second inputs, which are coupled to the preceding row of multiplexers 126, 128, 130 and 132. However, if the data is less than four bytes wide or if there is no constant data, zeros must be forced out on the unused bytes. Accordingly, multiplexers 134, 136, 138 and 140 are individually controlled to select their first inputs, which are coupled to ground, if the corresponding byte positions are not occupied by constant data. For example, if an instruction has one immediate operand which is two bytes wide, multiplexers 146, 148 are controlled to select their second inputs so as to output zeros in those byte positions while multiplexers 134 and 136 are controlled to select their first inputs so as to output the data byte.

When there is a second operand, the bytes of the second operand are forwarded out of constant extraction circuit 104 to the immediate two data port 112. The immediate two data port 110 does not include shadow registers or the first layer of multiplexers found in the other data ports 108 and 112. This is because, when an instruction has a second operand, it is always the last part of the instruction extracted and will never have to be held in the decode stage awaiting an additional part of the instruction. Accordingly, the second operand can always be forwarded directly out of the immediate two data port 110 to the remaining decode stage circuitry. It does, however, comprise the second layer of 2:1 multiplexers, 172, 174, 176, and 178 for selecting between the second operand data bytes and zero.

FIG. 5 is a more detailed block diagram of control decode logic 116 shown in FIG. 4. Control decode logic 116 decodes dynamic control information of the instruction, while the fixed functional instruction information is decoded by a microcode ROM 198. Random logic circuit 188 receives the three bytes output by the op-code assembly circuit 106 as well as the corresponding valid tag bits. When the first byte is a valid prefix byte, the random logic 188 updates the prefix register 114 as previously described. When the incoming bytes comprise an op-code, operation differs. Random logic 188 includes a small combinational logic circuit which determines certain dynamic parameters of the instruction. First, random logic 188 determines if the instruction has a MODR/M byte and/or SIB byte in the op-code sub-field and generates three one bit signals, NOMODHIT, MODHIT, and SIBHIT. The op-code bytes are simultaneously decoded in three tables, 190, 192 and 194 corresponding, respectively, to how the op-code byte(s) should be decoded if (1) there is no MODRIM byte, (2) there is a MODR/M byte, but no SIB byte, and (3) there is a MODR/M byte and a SIB byte. The data output from the tables 190, 192, 194 includes the length of the op-code and constant sub-fields of the instruction, the identity of the registers containing the base and index pointers to be used for addressing during that instruction, and the source and destination registers for data needed for or generated by that instruction. It also includes information as to when the decoding of the instruction is complete. The output of multiplexer 196 is latched into the buffers at the end of the decode stage for forwarding into the execute stage on the next pipeline cycle. The outputs of the three tables are forwarded to a 3:1 multiplexer 196, which is controlled responsive to the three aforementioned HIT signals generated by random logic 188 to select the output signals from the appropriate one of the three tables 190, 192, and 194. Alternately, tristates having outputs coupled to a common bus can be used in place of the multiplexer.

The dynamic control information includes the prefix parameters loaded into the prefix flag register 114, such as op-code shift length, constant shift length, base and index pointers, and register sources and destinations. The dynamic control information also includes the aforementioned HIT signal information and the data output by the tables 190, 192 and 194.

Referring again to FIG. 4, part of the dynamic control information output by three to one multiplexer 196 is used by address generation logic 200 to generate a microcode ROM entry address. Address generation circuit 200 includes a small combinational logic cell and some multiplexers for generating the entry address into the microcode ROM for the particular instruction based on the op-code byte, certain MODRIM bits and certain dynamic control information received from the tables in the control decode logic 116 through multiplexer 196. Responsive to a 12 bit address output from address generator 200, microcode ROM 198 output instruction sequencing control lines for the execute stage. The condition of these control lines are latched into buffers at the bottom of the decode logic for forwarding into the execute stage on the next pipeline cycle.

Figure 7:
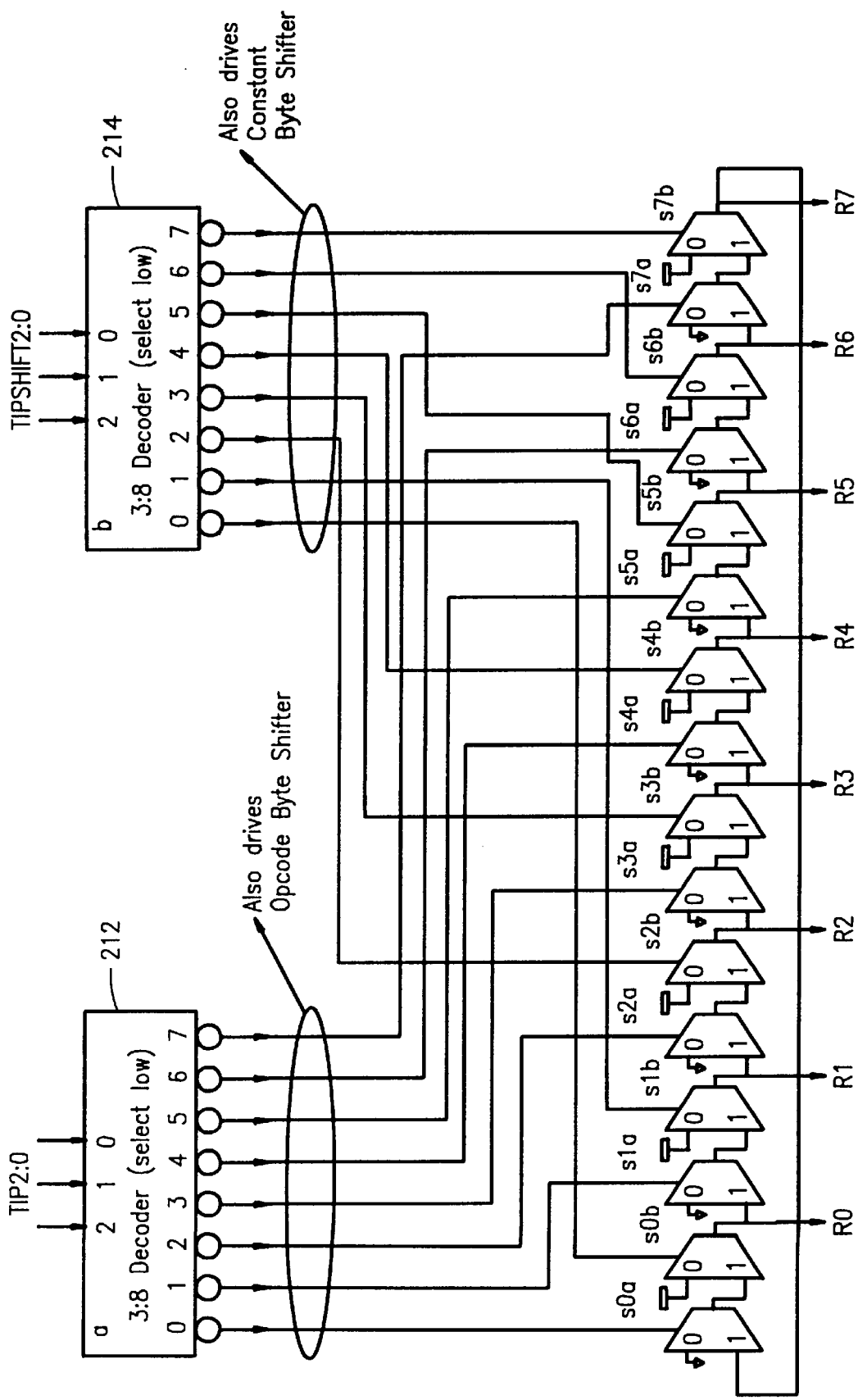
FIG. 7 is a block diagram illustrating control circuitry for generating line buffer valid bit reset signals according to a preferred embodiment of the present invention.

As instructions are consumed by the decode stage, the valid tag bits in the line buffer 12 must be reset accordingly. FIG. 7 illustrates an exemplary circuit for resetting the valid tag bits. As shown, the 3 LSBs of the TIP pointer are input to a three to eight decoder 212 and the 3 LSBs of the TIPSHIFT pointer are input into another three to eight decoder 214. The valid tag bits which are to be reset are those bits which are consumed by the decode stage in a given cycle, i.e., the bytes between TIP and TIPSHIFT. Thus, if TIP is pointing to byte position 2 in the line buffer 12 and TIPSHIFT is pointing to byte position 5 in the line buffer, the valid tag bits corresponding to byte positions 2, 3, and 4 should be reset, while the remaining valid tag bits, i.e., the tag bits of byte positions 0, 1, 5, 6 and 7, should not be altered by the decode stage reset circuit. (These bits, however, may be altered by prefetch stage circuitry to reflect the loading of instruction bytes into the line buffer from memory.)

The circuit shown in FIG. 7 generates eight reset bits, one corresponding to each byte position in the line buffer 12. A logical one indicates that the corresponding byte has been consumed and the corresponding valid bit should be reset in the line buffer. A logical zero indicates that the corresponding byte has not been consumed by the decode stage and the corresponding valid tag bit should not be altered. The reset bits RO through R7 are used in the prefetch stage as a mask, along with some other masks which indicate which byte positions in the line buffer 12 have received data from memory during that cycle, for updating the valid tag bits of the line buffer 12. Particularly, if a reset bit is set, then logic in the prefetch stage resets the corresponding valid tag bit in the line buffer. If a reset bit is not asserted, the logic in the prefetch stage allows the previous condition of the valid tag bit to remain unchanged. A detailed description of the circuit shown in FIG. 7 can be found in U.S. patent application Ser. No. 08/451,535 (now U.S. Pat. No. 5,617,543 issued Apr. 3, 1997), entitled "Non-Arithmetical Circular Buffer Cell Availability Status Indicator Circuit" filed on even date herewith (Attorney Docket No. NSC1-64000) and incorporated herein by reference.

The prefetch stage circuitry for resetting the valid tag bits in the line buffer is described in detail in U.S. patent application Ser. No. 08/445,569 (now U.S. Pat. No. 5,680,564 issued Oct. 21, 1997), entitled "Two Tier Prefetch Buffer Structure and Method with Bypass" filed on even date herewith (Attorney Docket No. NSC1-65000) and also incorporated herein by reference.

Figure 8:
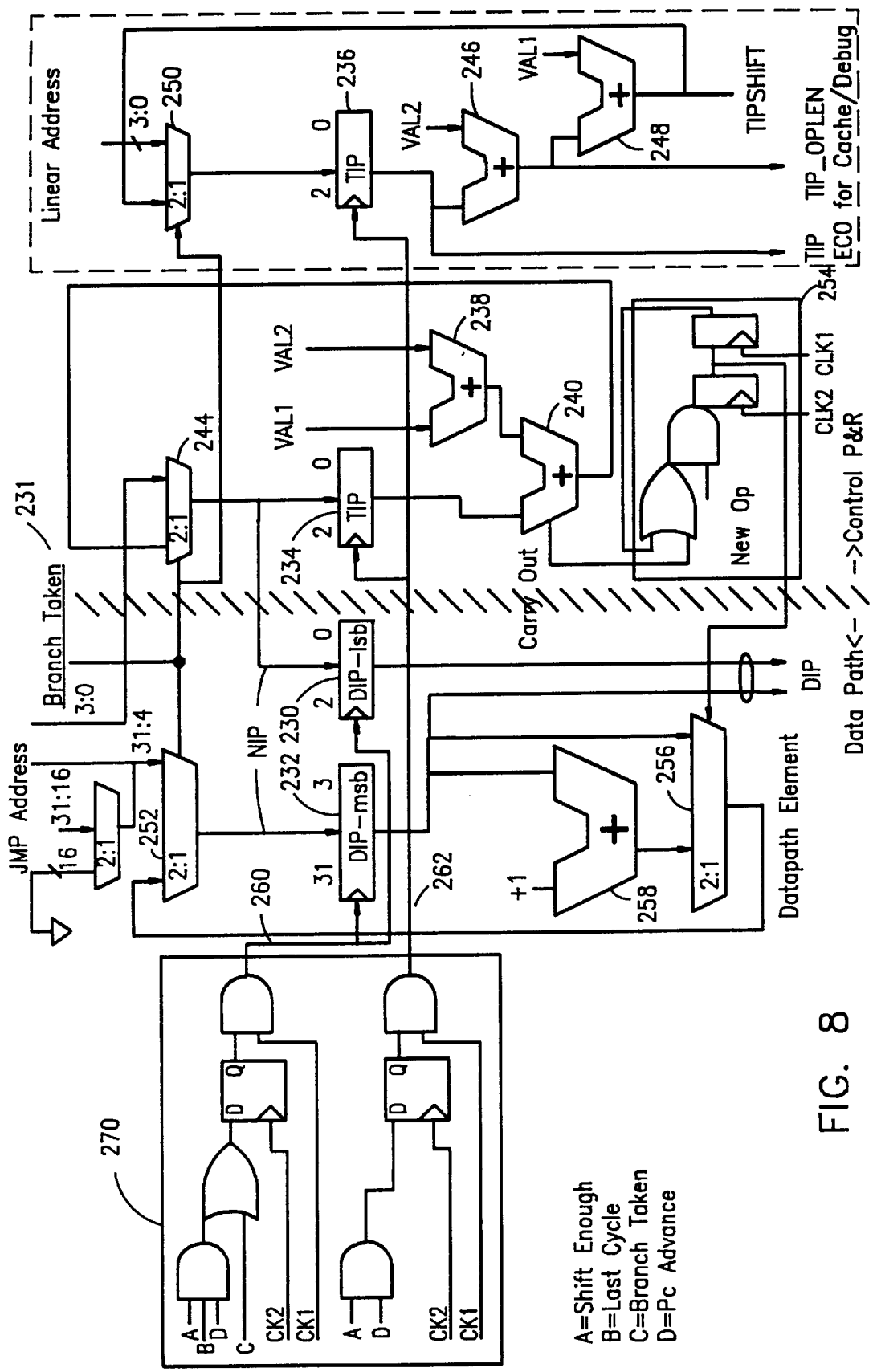
FIG. 8 is a block diagram of the instruction pointer unit shown in FIG. 4 according to a preferred embodiment of the present invention.

FIG. 8 illustrates in more detail the components of the instruction pointer generation circuit 100 of FIG. 4 for generating the DIP, TIP, TIPOPLEN and TIPSHIFT pointers. The 32 bit DIP pointer is collectively held within two registers 230 and 232. The three LSBs are held in register 230 while the 29 MSBs are held in register 232. The three LSBs of the TIP pointer are held in register 234. An additional copy is kept in register 236. The 3 LSBs of the DIP value always point to the byte position in the line buffer 12 at the beginning of the instruction currently being decoded by the decode stage. The 3 LSBs of the TIP value point to the byte position in the line buffer 12 which is the first sequential byte in the instruction which has not been consumed by the decode stage.

At the beginning of the decoding of each instruction, the TIP and DIP pointers are equal. There are four possible sets of control signals into the circuit shown in FIG. 8 depending upon the type of instruction which is being decoded and the portion of that instruction which is currently being consumed by the decode stage. Accordingly, as will become clear, the circuit of FIG. 8 can have its control lines set by a state machine. The four possible states of the circuit cover the following circumstances; (1) the decode stage is consuming a prefix byte, (2) the decode stage is consuming an op-code sub-field and the first operand in the constant data sub-field, if any, (3) the decode stage is consuming the second operand of an instruction and (4) a branch has occurred in the execute stage of the processor.

A first adder 238 has first and second inputs coupled to receive signals termed herein VAL1 and VAL2. The values of VAL1 and VAL2 depend on which of the four states the circuit is in. When the decode stage detects that the first byte in the op-code extraction circuit 102 is a prefix byte, it goes into the first state and VAL1 is set to one and VAL2 is set to zero. When the decode stage detects that the first byte in the op-code extraction circuit 102 is an op-code byte, it goes into the second state and VAL1 is set to the op-code width (which is pre-decoded from the op-code bytes, as previously mentioned) and VAL2 is set to the first operand width (which is pre-decoded from the op-code bytes, also as previously mentioned). (The first operand width is zero if the instruction does not include an operand.) When the decode stage is extracting the second operand of a two operand instruction, it goes into the third state and VAL1 is set to zero and VAL2 is set to the width of the second operand. Finally, if the circuit 100 receives a BRANCH TAKEN signal from the execute stage, it goes into the fourth stage in which the condition of the inputs of adder 238 will not matter. As can be surmised, the adder 238 generates the value which should be added to the TIP pointer to generate the TIPSHIFT pointer, termed herein SHIFT LENGTH.

The adder 238 adds together the two values and outputs the sum to a first input of a second adder 240. The second adder 240 receives the output of the 3 bit TIP register 234 at a second input. The adder 240 adds the two values to generate the 3 LSBs of the TIPSHIFT value. The output of adder 240 is sent to a 2:1 multiplexer 244, the output of which feeds the DIP register 230 and the TIP register 234. These connections allow the DIP and TIP pointers to be updated to TIPSHIFT as bytes are consumed, as will be described in more detail below.

A second pair of adders 246 and 248 perform a similar function of adding the TIP value. These adders, however, do the additions in a different order. Particularly, the first adder 246 adds VAL1 to the 3 LSBs of the TIP value stored in the second TIP register 250 to generate the TIPOPLEN pointer. The TIPOPLEN pointer is then added by adder 248 to VAL2 to generate another version of TIPSHIFT. The output of adder 248 is coupled to one input of a 2:1 multiplexer 236. The output of multiplexer 250 is the input to the second TIP register 236. Accordingly, TIP registers 234 and 236 are always updated.

The carry bit out of the third bit position of adder 240 is provided to a buffer circuit 254. When there is a carry bit out of the third bit position of adder 240, it means that a wrap around has occurred in the addressing of the bytes in the line buffer. Accordingly, the carry bit indicates that the value in the 29 MSB DIP register 232 must be incremented by one. Accordingly, buffer 254 outputs the select control signal to 2:1 multiplexer 256. The first data input of multiplexer 256 is coupled to the output of the 29 MSB DIP register 232. The second input to multiplexer 256 is the output of adder 258 which simply increments the DIP MSB value by one, as shown. When the carry bit in the third bit position of buffer 254 is asserted, multiplexer 256 selects the output of adder 258 as its input. Otherwise, it selects the value output from register 232. Stated simply, this circuitry increments the MSB portion of the DIP register 232 by one whenever a wrap around occurs in the line buffer 12.

The 2:1 multiplexers 244 and 250, as well as the 2:1 multiplexer 252, are provided so as to allow a different value to be loaded into these registers in the event of a branch. When the decoder stage receives a BRANCH TAKEN signal 231 from the execute stage, the pipeline stages preceding the execute stage (i.e., the prefetch and decode stages) must be flushed. Accordingly, the decode stage provides the BRANCH TAKEN signal to the select control inputs of multiplexers 244, 250 and 252. If the BRANCH TAKEN signal is not asserted, then multiplexers 244, 250 and 252 select their first inputs so that the TIP and DIP registers 234, 236, 232 can be updated as previously described. However, if a branch is taken, then the DIP and TIP registers must be reloaded with the destination address of the branch instruction. Accordingly, when BRANCH TAKEN is asserted, multiplexers 244, 250 and 252 select their second inputs which are coupled to received the branch address as generated elsewhere (usually in the execute stage).

The TIP and DIP registers 232, 234 and 236 cannot necessarily be incremented by the sum of VAL1 and VAL2 each cycle. For instance, the decode stage must stall until all of the bytes in the line buffer corresponding to the portion of the instruction to be decoded are tagged valid. The necessary valid bytes may number anywhere from 1 (when it is a prefix byte or a one byte instruction) to seven (when the instruction includes a three byte op-code sub-field and a four byte operand). Also, the decode stage may need to stall for reasons unrelated to the availability of bytes in the line buffer. For example, the execute stage may be executing a very time consuming instruction so that even though the line buffer contains the necessary bytes to decode, the decode stage must stall because it cannot forward the decoded instruction to the execute stage until the execute stage has finished executing the previous instruction. Further, while the TIP pointer is updated every time bytes are consumed by the decode stage, DIP is updated only when the last byte of an instruction is consumed.

Accordingly, the clock enable signals 260 and 262 for the DIP and TIP registers, respectively, are controlled so as to be asserted to allow these registers to be updated to TIPSHIFT only when bytes are actually consumed and conditions are proper for updating.

Particularly, referring to the combinational logic shown in box 270 of FIG. 8, the clock enable 260 for the DIP registers 230 and 232 is asserted only when the BRANCH TAKEN signal is asserted or the last cycle, shift enough and the program counter advance signals are all asserted. The last cycle signal simply indicates that the last portion of the instruction is being consumed. It can be easily derived from the op-code of the instruction. The shift enough signal is a signal which indicates that the number of bytes needed to decode the relevant portion of the instruction are all tagged valid. This signal can be easily derived from logical combination of the data pre-decoded from the instruction as previously discussed and the line buffer valid tag bits. Finally, the program counter advance signal is asserted when the decode stage has completed the current decode cycle.

The TIP register clock enable signal 262 is asserted only if the program counter advances, and the shift enough signal is asserted. The logic circuitry shown in box 270 illustrates an exemplary circuit for generating the DIP and TIP clock enable signals 260 and 262 as just described.

Having thus described a few particular emobiments of the invention, various alterations, modifications and improvements will readily occur to those of skill in the art. Such alterations, modifications and improvement as are made obvious by this disclosure are intended to be part of this description though not expressly stated herein, and are intended to be within the spirit and scope of the invention. Accordingly, the foregoing description is by way of example only and is not limiting. The invention is limited only as defined in the following claims and equivalents thereto.

What is claimed is:

1. Pipelined processor having consecutive pipeline cycles and including at least a prefetch stage, a decode stage, and an execute stage, said instructions comprising instruction segments and said segments comprising instruction portions, said processor further comprising;

a line buffer in said prefetch stage for storing instruction portions retrieved from memory, said line buffer having a line width less than a maximum possible instruction width, retrieving said means for retrieving instruction portions from said line buffer into said decode stage including a plurality of shadow registers for storing an instruction portion retrieved from said line buffer, a decoder in said decode stage coupled to receive said instruction portions from said retrieving means, for decoding an instruction segment when said decoder has received a predetermined instruction segment from said retrieving means and for preventing decoding otherwise, and control means for causing said shadow register to store an instruction portion until said retrieving means has retrieved all instruction portions comprising said predetermined instruction segment corresponding to said stored instruction portion and for causing said retrieving means to output said stored instruction portion along with any other retrieved instruction portion comprising said predetermined instruction segment when said retrieving means has retrieved all said instruction portions comprising said predetermined instruction portion, wherein said control means comprises a multiplexer for selectively coupling said instruction portions from said retrieving means to said decoder (1) directly from said line buffer or (2) from said shadow registers, and wherein said multiplexer complises a 2:1 multiplexer having a first input coupled to said shadow registers and a second input coupled directly to said line buffer and an output coupled to said decoder.

2. The processor as set forth in claim 1 wherein said processor has a variable length instruction set in which instructions include an op-code portion, and may include either a first operand portion or a first operand portion and a second operand portion, and further wherein each of said shadow register includes a shadow register for storing said op-code portion and said first operand portion of said instruction.

3. The processor as set forth in claim 2 wherein said processor further comprises means for determining if an instruction includes said second operand portion and wherein said control means is responsive to said instruction having said second operand portion for storing said op-code and first operand portions of said instruction in said shadow register if said instruction includes said second operand portion.

4. The processor as set forth in claim 1 wherein said line buffer includes at least one storage position for storing an instruction portion and said prefetch stage further comprises a valid tag bit register for storing a valid tag bit corresponding to each storage position in said line buffer, said valid tag bit indicating whether said corresponding storage position holds an instruction portion which is to be decoded and wherein said control means further comprises resetting means for resetting the valid tag bit corresponding to a storage position so as to allow said prefetch stage to store additional instruction portions in said storage positions, when the instruction portion stored in said storage location has been retrieved by said retrieving means.

5. In a pipelined processor, a method of retrieving instructions from memory and decoding said instructions, said instructions comprising instruction segments and said segments comprising instruction portions, comprising the steps of:

(1) continuously retrieving instruction portions from said memory in discrete time periods and storing said retrieved instruction portions in a buffer in a prefetch stage, (2) continuously retrieving instruction portions from said buffer into a decode stage, (3) continuously storing said instruction portions retrieved from said buffer in a shadow register, if less than a predetermined instruction segment of an instruction portion retrieved from said buffer in a shadow register, if less than a predetermined segment of an instruction corresponding to each of said instruction portions has been retrieved from said buffer and forwarding said stored instruction portions for decoding when all of a predetermined instruction segment corresponding to each of said instruction portions has been retrieved from said buffer, (4) decoding said predetermined instruction segment, wherein step (3) includes steps of causing said instruction portions stored in said shadow register to be forwarded for decoding along with a remaining portion of said instruction when said decode stage has retrieved all instruction portion of said predetermined segment, and wherein said buffer includes at least one storage position for storing an instruction portion, (5) storing a valid tag bit corresponding to each storage portion in said buffer, said valid tag bit indicating whether said corresponding storage position holds an instruction portion which is to be decoded and therefore cannot be overwritten; and (6) clearing the valid tag bit corresponding to a storage position, so as to allow said storage position to be overwritten with another instruction portion, when the instruction portion stored in said storage location has been retrieved.

6. A decode apparatus for a pipelined processor for decoding instructions, said instructions including dynamic control information and fixed control information comprising;

a decoder comprising:
a combinational logic circuit for decoding said dynamic control information, and
a memory for decoding said fixed information,
wherein an instruction includes an op-code portion and may include one or more prefix portions for setting prefix parameters:
a line buffer for storing instruction portions to be decoded;
an extraction circuit for extracting an instruction portion from said line buffer;
means for determining if said instruction portion includes said one or more prefix portions; and
said combinational logic including means for decoding said one or more prefix portions of an instruction before any other portion of said instruction, and
wherein said instruction may include plural prefix portions and wherein said combinational logic includes means for decoding each prefix portion successively.

7. The apparatus as set forth in claim 5 further comprising:
a prefix register for storing prefix parameter default conditions which will be used when said instruction is decoded, and
means for causing said prefix register to be re-written with said prefix parameter from a prefix portion of said instruction, if said instruction includes said prefix portion.

8. An appartaus as set forth in claim 7 wherein said prefix information may include one or more of an addressing width for the instruction, a data width for the instruction, and whether a data bus is to be locked during the instruction.

9. The apparatus as set forth in claim 6 wherein said processor has a variable width instruction set and said line buffer is less wide than a maximum possible instruction width and further wherein said combinational logic circuit decodes said prefix portion of an instruction before any other portion of the instruction is decoded.

10. The apparatus as set forth in claim 9 wherein said instructions may further include a first operand portion or a first and a second operand portion, wherein said extraction circuit comprises;
means for extracting said op-code portion and said first operand portion, if any, from said line buffer simultaneously after said prefix portion is decoded, and
means for extracting said second operand portion, if any, from said line buffer after said op-code portion and first operand portion, if any, are extracted.

11. The apparatus as set forth in claim 10 further comprising;
a shadow buffer for storing said op-code portion and said first operand portion, and
control means for causing said shadow buffer to store said op-code portion and said first operand portion, when an instruction comprises a second operand, until said means for extracting has extracted said second operand.

12. The apparatus as set forth in claim 11 wherein said means for extracting further comprises means for sending said op-code portion, first operand portion and second operand portion to said decoder simultaneously.

13. The apparatus as set forth in claim 6 wherein said instruction includes an op-code instruction portion and include a constant data instruction portion, and said dynamic information may include one or more of the width of the op-code portion, the width of the constant portion, the identity of a register from which data is to be retrieved by the instruction, the identity of a register to which data is to be written by the instruction, a pointer to a base address for addressing by instruction and a pointer to an index for addressing by the instruction.

* * * * *